(12) United States Patent
Yaung

(10) Patent No.: US 6,643,664 B1
(45) Date of Patent: Nov. 4, 2003

(54) DATA CONVERSIONS SOLVING TIME LIMITATIONS OF OBJECT-ORIENTED SOFTWARE PROGRAMS

(75) Inventor: Alan Tsu-I Yaung, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/497,782

(22) Filed: Feb. 3, 2000

Related U.S. Application Data (60) Provisional application No. 60/154,409, filed on Sep. 17, 1999.

(51) Int. Cl.$^7$ .............................................. G06F 17/30
(52) U.S. Cl. ................ 707/103 R; 707/100; 707/103 Y
(58) Field of Search ..................... 707/103 R, 100–102, 707/103 Y (56) References Cited

U.S. PATENT DOCUMENTS

| | | | | |
|---|---|---|---|---|
| 5,526,515 A | * | 6/1996 | Ross et al. ................... | 713/500 |
| 5,745,796 A | | 4/1998 | Hancock | |
| 5,758,346 A | * | 5/1998 | Baird ............................. | 707/1 |
| 5,761,668 A | | 6/1998 | Adamchick | |
| 5,806,067 A | | 9/1998 | Connor | |
| 5,808,889 A | * | 9/1998 | Burgess ....................... | 345/963 |
| 5,812,841 A | * | 9/1998 | Soeder .......................... | 707/6 |
| 5,835,909 A | * | 11/1998 | Alter .............................. | 707/1 |
| 5,852,824 A | * | 12/1998 | Brown .......................... | 707/1 |
| 5,974,569 A | * | 10/1999 | Nickles ........................ | 714/33 |

OTHER PUBLICATIONS

Andy Kaylor, CGoodTime—A Y2.038K–safe Replacement for CTime, http/www.codeguru.com/cpp_mfc/goodtime.shtml, Dec. 15, 1998, pp. 1–3.*

Henrik and Peter, Dr. GUI on the Year 2038 Bug, 2002 Microft Corporation, Sep., 7, 1998, pp. 1–2.*

Unknown Author, What is the Year 2038 problem?, http://www.howstuffworks.com/question75.html, Printed dated May 3, 2002, pp. 1–2.*

Roger M. Wilcox, The Year 2038 Problem, http://pw1.netcom.com/~rogermw/Y2038.html, Apr. 20, 2001, pp. 1–4.*

Greg Perry, Object–Oriencted Programming with Turbo C++ in 21 days, 1993, pp. 224–225, 512–515, 517–518.*

Brett, Bevin R., System and method for generating an object structure at run time in an object–oriented programming language, Publication No. US 2002/0016864 A1, Publication date Feb. 7, 2002.*

Inquiry.com staff, "Q & A—Can it Recognize Dates Before Jan. 1. 1970?," http://www.inquiry.com/techtips/mfc_pro/answer.asp?pro=mfc_pro&docID–1091, pp. 1–2, Mar. 25, 1997.

This article was contributed by Dan Querciagrossa, "RFX_Date Using COleDateTime," http://ice.sdibm.edu.cn/online–book/mfc/mfc_database/rfx_oledatetime.shtml.htm, pp. 1–6, Copyright 1997 Zahir Anjum.

* cited by examiner

*Primary Examiner*—Greta Robinson
*Assistant Examiner*—Debbie M. Le
(74) *Attorney, Agent, or Firm*—Sughrue Mion, PLLC (57) ABSTRACT

A method, apparatus, and article of manufacture for converting dates in object-oriented software programs utilizing time classes covering limited periods of time is provided. A conversion object identifies a target year in which an application program should execute. If the target year falls outside of the limited period of time, the conversion object converts the target year into a base year which falls within the limited time period and a corresponding offset. The application program is then executed with the target year, and if the target year is needed by the application program, it can be reconstructed by adding the base year and corresponding offset.

6 Claims, 6 Drawing Sheets

DATA CONVERSIONS SOLVING TIME LIMITATIONS OF OBJECT-ORIENTED SOFTWARE PROGRAMS

PROVISIONAL APPLICATION

This application claims the benefit of U.S. Provisional Application No. 60/154,409, entitled, "TECHNIQUE FOR HANDLING DATE CONVERSION FOR MFC-BASED C++ APPLICATIONS," filed Sep. 17, 1999, by Alan T. Yaung, which is incorporated by reference herein.

BACKGROUND OF THE INVENTION

1. Field of the Invention

This invention generally relates to date-year conversions in computer software programs, and in particular, to date-year conversions in object-oriented software programs utilizing classes which limit the time that computer applications may be utilized.

2. Background of the Invention

The Y2K (i.e., the year 2000) bug has had a profound impact on everyday life of almost each individual. Computer systems used in various processing applications, such as, for example, processing insurance, account, inventory, investment, and retirement information, as well as many other applications, often operate with records and data containing date-dependent information. In many computing systems, date information relating to years has typically been represented in two-digit year formats, where two digits represent a year between 1900 and 1999. Thus, for example, the two digits "97" would represent the year 1997. Popular usage of this simplified date information format throughout the computer industry has resulted in an industry-recognized problem, often referred to as "the year 2000 problem."

More specifically, as a result of this simplification of date information, upon the turn of the century (i.e., upon the year 2000), two-digit year information intended to represent a year within the 21st century will, instead, be indistinguishable by computer systems from a year within the 20th century (i.e., between 1900 and 1999). Thus, for example, a two-digit year value of "08" which is intended to represent the year 2008 will be indistinguishable from the year 1908 by such computer systems.

In preparing for the turn of the century, substantial time and resources have been invested to insure that computer systems will continue to operate past the year 2000. Based on their experience with the Y2K problem, the public, the government, businesses, financial institutions, and computer companies are keenly aware of the costly effects of correcting date and year restrictions within computer systems.

Additionally, Microsoft Foundation Class (MFC), a popular object-oriented toolkit for developing Windows-based C++ applications, has a well-known date conversion problem, even with the recent focus on date-year restrictions in software programs. The date conversion problem arises because MFC-based applications are capable of representing dates only from 1970 to 2038. While this date problem may not be as critical as the Y2K problem, it is severe enough to jeopardize the normal execution of a business application. The implication of this problem is significant for mission critical MFC-based business software, and if this problem is not addressed properly, the "Year 2038" bug will surface for MFC-based C++ applications.

In object-oriented software programs, the term "object-oriented" refers to a software design method which uses "classes" and "objects" to model abstract or real objects. An "object" is the main building block of object-oriented programming, and is a programming unit which has both data and functionality (i.e., "methods"). A "class" defines the implementation of a particular kind of object, the variables and methods it uses, and the parent class to which it belongs.

The problem in MFC-based C++ applications is related to the CTime class. CTime is defined in terms of a variable called "time_t". The variable time_t is a variation of the original UNIX time variable which is defined according to American National Standards Institute (ANSI) standards. The first version of UNIX was developed in 1969 and became effective in 1970. The UNIX time variable, like time_t, counts the number of seconds that have elapsed since Jan. 1, 1970.

The variable time_t is a 32-bit signed long integer representing 2,147,483,647 positive time values and measuring the number of seconds that have elapsed since Jan. 1, 1970. Since there are 86,400 seconds in a day (approximately 31,557,600 seconds in a year based on 365.25 days in a year), the maximum time value that may be represented after Jan. 1, 1970 is approximately 68 years. Thus, time_t is only capable of representing dates from 1970+68 years, i.e., from years 1970 to 2038. More specifically, time_t can calculate time from Jan. 1, 1970, 24:00 hours to Jan. 18, 2038, 19:14:07 hours. After Jan. 18, 2038, 19:14:07 hours, time_t rolls over to a negative number and no longer counts the number of seconds that have elapsed since Jan. 1, 1970.

Consequently, any application program utilizing software based on time_t, including software based on the CTime class of MFC, can not maintain accurate dates and times before Jan. 1, 1970 or after Jan. 18, 2038. This bug exists in each and every object-oriented application utilizing CTime—the problem does not depend on which type of program is utilized or which company developed the program. A number of solutions to solve this problem have been proposed. However, all of these potential solutions have significant shortcomings.

One potential solution is to rewrite the CTime class to accommodate dates before 1970 and after 2038. This approach, however, would require investment of substantial time and money to modify the class and related programs. Furthermore, any modifications to CTime may introduce potential defects into the program. Thus, this solution does not adequately address the problem based on the required time and money required to implement the modifications and resulting defects.

A second potential solution to the year 2038 problem is to rewrite application programs to represent dates beyond the year 2038. This solution, however, is not practical since it requires computer code modifications to not only the application programs, but also to date dependent data files generated by these programs. Modifying data files is likely to be even more costly than modifying application programs simply based on the large number of data files. Thus, this approach does not adequately address the problem.

Third, it has been proposed that the system clock be reset when the year 2038 arrives. This solution, however, is not practical since making changes to the system clock would necessarily result in changes to date dependent data fields. Further, files that were created on two different dates would be assigned the same date. Thus, even if the clock is reset, users would still need to reformat date-year dependent data files.

A final approach to solving the year 2038 problem is to use different time classes within MFC. Utilizing other MFC time classes, however, does not adequately address this problem. One problem associated with other MFC time classes is that all of the years from year 1 to 9999 can not be represented. Rather, other MFC time classes can only represent years 100 to 9999. A second problem with these alternate MFC classes is that they are not as accurate as CTime. CTime can represent time and dates very accurately—in increments of hours, minutes, and seconds. Other MFC time classes, however, are only capable of representing time increments in days. A third shortcoming of other MFC time classes is that users are subjected to unnecessary inconvenience. Implementing other time classes in application programs currently utilizing CTime requires users to modify their application program to terminate CTime and to initiate the other time class. These modifications are necessary because other MFC date-related classes do not derive from the CTime class and do not have a CTime constructor. A final problem with other MFC date related classes is that once a user converts to an alternate MFC time class, the user is essentially prevented from converting back to CTime. Users can convert back to CTime if the desired year falls within the range of 1970–2038. However, converting back to CTime within this time period is not particularly useful since CTime and the other date-related classes operate within this time frame. Thus, the user is essentially prevented from converting back to CTime for the problem years outside the range of 1970–2038. Based on these shortcomings, other MFC time classes do not adequately address the 2038 bug based on the required modifications and user inconvenience.

Accordingly, there is a need in the art for a program that converts date-year data in object-oriented software programs created with the CTime class of MFC to insure that systems based on CTime will operate well past the year 2038. This program should convert dates without inconveniencing system users while providing detailed time, date and year information spanning all of the years from 1 to 9999. Further, this program should convert dates without modifying application programs, related data, and system clocks.

SUMMARY OF THE INVENTION

To overcome the limitations in the prior art described above, and to overcome other limitations that will become apparent upon reading and understanding the present specification, the present invention discloses a method, apparatus, and article of manufacture for solving date-year restrictions in object-oriented software programs.

In accordance with the present invention, a technique for converting dates in object-oriented software programs is provided. Initially, a conversion class encapsulates a time class that covers a limited time period. A conversion object is then generated from the conversion class, and when the conversion object is invoked, a target year in which an application program should execute is identified. If that target year is outside of a limited time period, the target year is converted to one that falls within the limited time period.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and which is shown by way of illustration a specific embodiment in which the invention may be practiced. It is to be understood that other embodiments may be utilized as structural changes may be made without departing from the scope of the present invention. Further, the sample class structure and objects provided below are in the C++ programming language, but one skilled in the art will recognize that Java, ActiveX or another programming language with suitable object-oriented programming capabilities may likewise be utilized.

Hardware Environment

Figure 1:
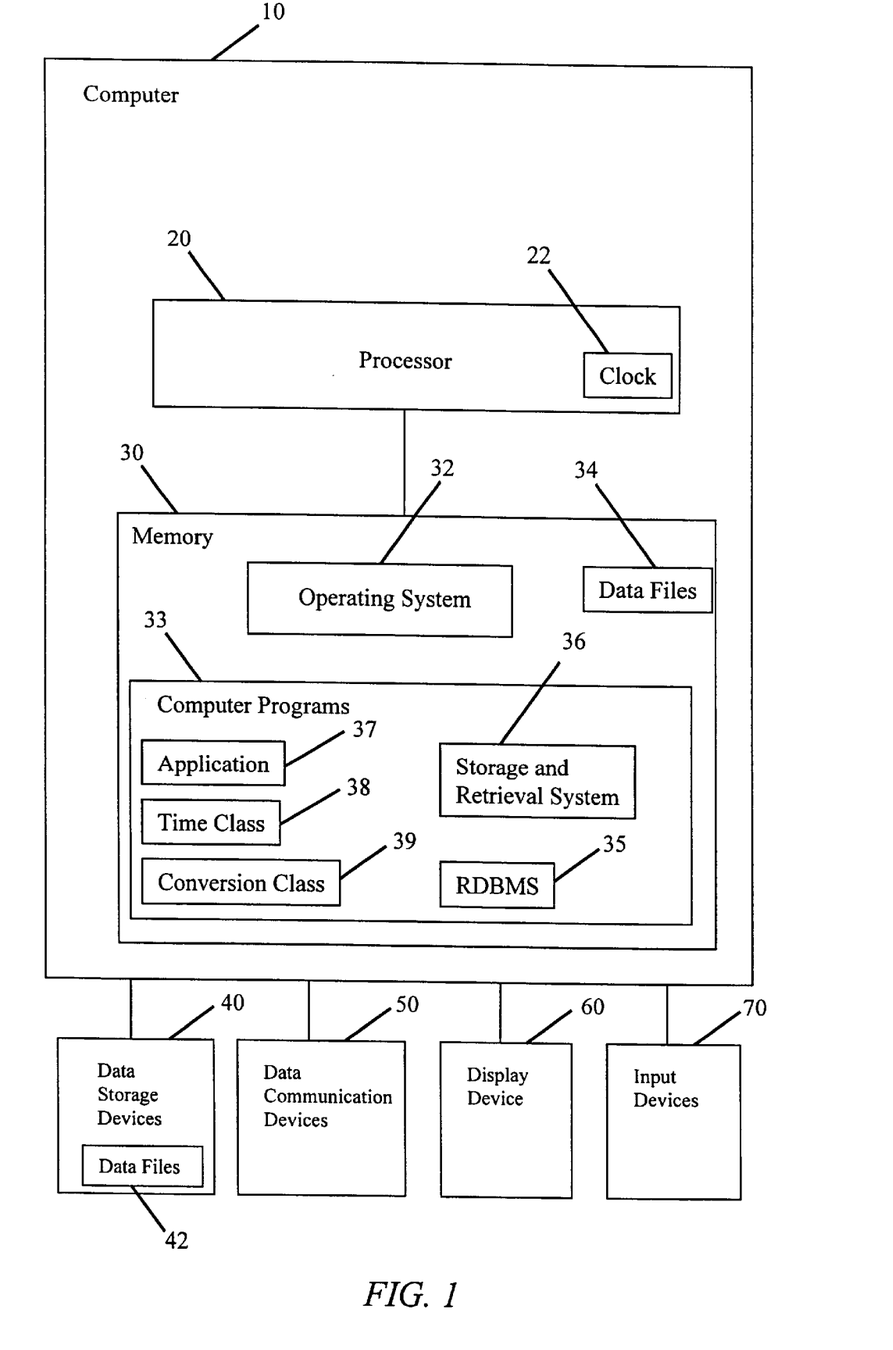
FIG. 1 schematically illustrates the hardware environment of a preferred embodiment of the present invention, and more particularly, illustrates a typical distributed computer system.

FIG. 1 is a hardware environment used to implement an embodiment of the invention. The present invention is typically implemented using a computer 10, which generally includes, inter alia, a processor 20, random access memory (RAM) 30, data storage devices 40 (e.g., hard, floppy, and/or CD-ROM disk drives, etc.), data communications devices 50 (e.g., modems, network interfaces, etc.), display device 60 (e.g., CRT, LCD display, etc.), and input devices 70 (e.g., mouse pointing device and keyboard). It is envisioned that attached to the computer 10 may be other devices, such as read only memory (ROM), a video card, bus interface, printers, etc. Those skilled in the art will recognize that any combination of the above components, or any number of different components, peripherals, and other devices, may be used with the computer 10.

The computer 10 operates under the control of an operating system (OS) 32. The OS 32 is booted into memory 30 ofthe computer 10 for execution when the computer 10 is powered-on or reset. In turn, the OS 32 then controls the execution of one or more computer programs 33, such as relational database management system (RDBMS) software 35 or a storage and retrieval system 36. The present invention is generally implemented in these computer programs 33, which execute under the control of the OS 32 and cause the computer 10 to perform the desired functions as described herein.

Additionally, the present invention works with RDBMS software 35, such as the DB2 product sold by IBM Corporation, although it may be implemented with any database management system (DBMS) software. The RDBMS software 35 receives commands from users for performing various search and retrieval functions, termed queries, against one or more databases stored in the data storage devices 40. In an embodiment, these queries conform to the Structured Query Language (SQL) standard, although other types of queries could also be used without departing from the scope of the invention.

The OS 32 and computer programs 33 are comprised of instructions which, when read and executed by the computer 10, causes the computer 10 to implement and/or use the present invention 100. Generally, the OS 32 and/or computer programs 33 are tangibly embodied in and/or readable from a device, carrier, or media, such as memory 30, data storage devices 40, and/or data communications devices 50. Under control of the OS 32, the computer programs 33 may be loaded from the memory 30, data storage devices 40, and/or data communications devices 50 into memory 30 of the computer 10 for use during actual operations.

Thus, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media Of course, those skilled in the art will recognize many modifications may be made to this configuration without departing from the scope of the present invention.

Those skilled in the art will also recognize that the environment illustrated in FIG. 1 is not intended to limit the present invention. Indeed, those skilled in the art will recognize that other alternative hardware environments may be used without departing from the scope of the present invention.

Referring to FIG. 1, the present invention converts dates in a computer system 10 having a processor 20 with a clock 22, memory 30 for storing data files 34, an operating system 32, computer programs 33 such as application programs (e.g., database retrieval programs or programs related to Internet searches) 37 created with the Microsoft Foundation Class (MFC) object-oriented programming toolkits utilizing a CTime time class 38, and a conversion or wrapper class 39. In addition, the system 10 may have data storage devices 40 for storing other data files 42.

Data Conversions Solving Time Limitations of Object-oriented Software Proprams

Figure 2:
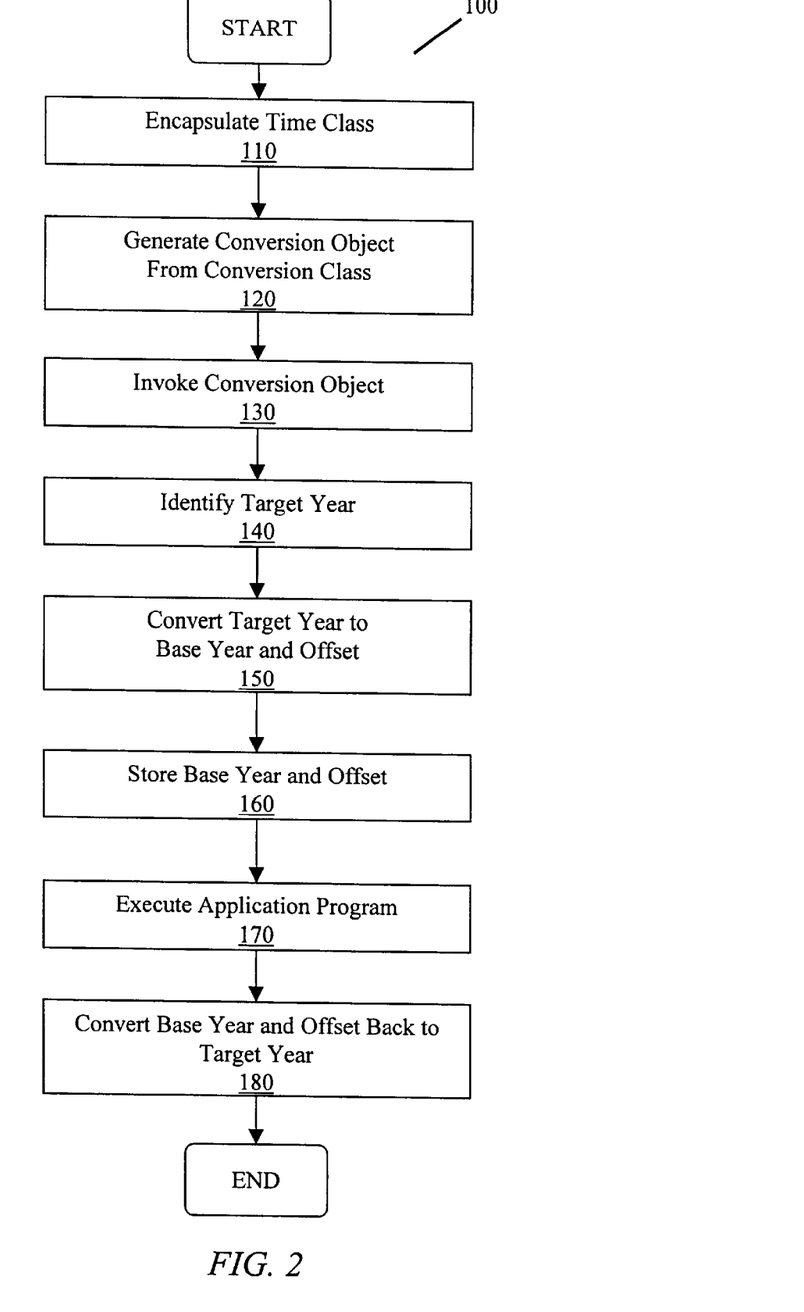
FIG. 2 is a flow diagram illustrating the date conversion program.

Referring to FIG. 2, a flow diagram ofthe present conversion invention 100, illustrates how certain dates are converted and application programs 37 are executed by encapsulating a time class with a conversion class (block 110); generating a conversion object from the conversion class (block 120); invoking the conversion object (block 130); identifying a target year (block 140); converting the target year (block 150); storing the base year and resulting offset (block 160), executing the application program with the target year (block 170), and after the program 37 has executed, converting the base year back to the target year (block 180). Following is a more detailed description of the present invention 100.

1. Encapsulating a Time Class

Referring to FIG. 2, a conversion or wrapper class encapsulates the CTime class (block 110). One embodiment ofthe invention provides two conversion classes 39 to perform this function: DKDate and DKTimestamp. Within the Windows NT platform, the DKDate and DKTimestamp classes are implemented utilizing the CTime class 38 of MFC.

1A. Definition of DKDate Conversion Class

DKDate is one conversion class 39 that encapsulates a CTime class 38. DKDate is an object-oriented representation of a date with year, month, and date data and is defined as follows:

```
class DKDate
{
public:
    DKDate (int nYear, int mm, int nDay);
    DKDate ( );
    virtual ~DKDate ( );
    int getYear ( ) const;
    int getMonth ( ) const;
    int getDay ( ) const;
private:
    int _diff;
    CTime_t;
};
```

The DKDate class defines an object with a specified year (nYear), month (mm), and day (nDay) or alternatively, the current system time. DKDate is also defined with both public methods and private data. Public methods are available to both the conversion program 39 and the application program 37. The public methods include getYear, getMonth, and getDay. Private data is available to the conversion program 39 but not to any application program 37. Private data includes an integer representing the value of an offset or differential ("_diff") and an object ("_t") generated from the CTime class 38. The variables _diff and _t are designated as private such that the application program 37 does not utilize any date data generated by CTime 38 since these dates may be before 1970 or after 2037 causing the application program 37 to fail.

1.B. Definition of DKTimestamp Conversion Class

DKTimestamp is another conversion class 39 provided by the IBM DB2 Digital Library that encapsulates a CTime class (block 110). DKTimestamp is an object-oriented representation of a timestamp including year, month, day, hour, minute, second, and nanosecond data and is defined as follows:

```
class DKTimestamp
{
public:
    DKTimestamp  (int nYear, int nMonth, int nDay,
                  int nHour=0, int nMin=0, int nSec=0,
                  int nNano = 0, int DST = -1);
    DKTimestamp( );
    virtual ~DKTimestamp( );
    int getYear ( ) const;
    int getMonth ( ) const;
    int getDay ( ) const;
    int getHours ( ) const;
    int getMinutes ( ) const;
    int getSeconds ( ) const;
    int getNanos ( ) const;
private:
    int _nanos;
    int _diff;
    CTime_t;
};
```

The DKTimestamp class defines an object similar to a DKDate object with a specified year (nYear), month (mm), day (nDay) or current system time. In addition, DKTimestamp provides for hour (nHour), second (nSec), and nanosecond (nNanos) time parameters. Further, DKTimestamp allows a user to designate daylight savings time (DST).

As a default, DKTimestamp assigns nHour, nMin, nSec, and nNano a value of 0. In addition, DKTimestamp assigns a default value of (−1) to DST to designate that this class does not utilize DST. Ths DST value, however, may be modified by the user.

DKTimestamp is also defined with public methods and private data. DKTimestamp public methods include getYear, getMonth, getDay, getHours, getMinutes, getSeconds, and getNanos. However, the number of nanoseconds (_nano), an integer representing the value of an offset or differential (_diff) and an object generated from the CTime class (_t) are designated as private data. Similar to DKDate, DKTimestamp also designates the _diff and _t variables as private data such that the application program 37 will not utilize any date data generated by the CTime 38. In addition, DKTimestamp designates the _nanos variable as private data. CTime 38 can read the number of seconds, but not the number of nanoseconds. Designating nanos as private data ensures that application programs 37 will not fail if they attempt to read the number of nanoseconds generated from DKTimestamp.

2. Generating a Conversion Object From Conversion Classes

Referring to FIG. 2, after a DKDate or DKTimestamp conversion class 39 has encapsulated the CTime class 38, a conversion object is generated (block 120).

2.A. DKDate Constructors

When a DKDate wrapper class is instantiated, a DKDate object will be generated. DKDate objects may be generated from two different DKDate constructors. One DKDate constructor implements a DKDate class with year, month, and day data whereas the second DKDate constructor implements a DKDate class with current system time.

2.A.1. DKDate Constructor With Year, Month and Day

The first DKDate constructor provides a DKDate object with year, month, and day parameters. This DKDate constructor is defined as follows:

```
DKDate::DKDate (int nYear, int mm, int nDay)
{
        _diff = 0;
        if(nYear > 2037)
        {
            _diff = (nYear - 2037);
            _t = CTime (2037, mm, nDay, 0, 0, 0,-1);
        }
        else if(nYear < 1970)
        {
            _diff = (nYear - 1970);
            _t = CTime (1970, mm, nDay, 0, 0, 0,-1);
        }
        else
        {
            _diff = (0);
            _t = CTime (nYear, mm, nDay, 0, 0, 0, -1);
        }
}
```

2.A.2. DKDate Constructor With Current System Time

The second type of DKDate constructor used to generate DKDate objects from the DKDate class is a constructor utilizing current system time. Current system time may be identified in a parameter that is retrieved from the computer 10, system clock 22, a program 33, or some other source. This constructor is implemented by the following:

```
DKDate: :DKDate ( )
{
    time_t _time;
    time_t* = pTime &_time;
    struct tm temp;
    struct tm* pTemp = &temp;
```

```
    _time = time ((time_t*)NULL);
    pTemp = localtime (pTime);
    int nSec = pTemp->tm_sec;
    int nMin = pTemp->tm_min;
    int nHour pTemp->tm_hour;
    int nDay = pTemp->tm_mday;
    int nMon = pTemp->tm_mon+1;
    int nYear = pTemp->tm_year + 1900;
    _diff =0;
    if(nYear > 2037)
    {
        _diff = (nYear - 2037);
        _t = CTime(2037, nMon, nDay, nHour, nMin, nSec, -1);
    }
    else if (nYear < 1970)
    {
        _diff = (nYear - 1970);
        _t = CTime(1970, nMon, aDay, nHour, nMin, nSec, -1);
    }
    else
    {
        _diff = (0);
        _t = CTime(nYear, nMon, NDay, nHour, nMin, nSec, -1);
    }
}
```

The DKDate constructor based on current system time does not require a user to input year, month, and day parameters. As the first line "DKDate::DKDate( )" illustrates, there are no input parameters. Rather, time data is retrieved by the "localtime" fuinction which queries a local system or server.

The DKDate constructor utilizing current system time generates a DKDate object with year, month, day, hour, minute, and second data. Second, minute, hour and day variables (nSec, nMin, nHour, and nDay) are assigned the same values as provided for by the local system (tm_sec, tm_min, tm_hour, and tm_mday). The month variable (nMon), however, is not assigned the same value as the month value provided by the local system. Rather, nMon is assigned the local system month value (tm_mon) offset by +1 to account for the ANSI system of designating January=0, February=1, ... December=11. Thus, with the +1 offset, January is the first month (i.e., January=1), February is the second month, (i.e., February=2), etc. Similarly, year variable (nYear) is not assigned the value provided for by the local system. Rather, nYear is assigned the local system year variable (tm_year) offset by +1900 to account for the computer system 10 designating year 1900 as year 0, 1901 as year 1, and so on. For example, representing the year 1945 requires the system output (tm_year=45) to be offset by 1900 such that nYear=1945. The DKDate constructor based on current system time utilizes a number of definitions and functions which will be described in further programming detail including time_t and struct tm definitions (and related CRTIMP definition) and the localtime function (and related _cdecl and MSC_VER and definitions).

2.A.2.a DKDate Constructor With Current System Time-time_t Definition

The definition time_t is a long, signed integer representation of time data and is defined by the following:

```
/* Define the implementation defined time type */
#ifndef _TIME_T_DEFINED
typedef long time_t;          /* time value*/
*define_TIME_T_DEFINED /* avoid multiple definitions of time_t */
#endif
```

-continued

```
#ifndef _CLOCK_T_DEFINED
typedef long clock_t;
#define _CLOCK_T_DEFINED
#endif
#ifndef _SIZE_T_DEFINED
typedef unsigned int size_t;
#define _SIZE_T_DEFINED
#endif
```

2.A.2.b. DKDate Constructor With Current System Time-struct tm Definition

The struct tm definition is the structural form of the time structure "tm" and is defined by the following:

```
#ifndef _TM_DEFINED
struct tm {
int tm_sec;      /* seconds after the minute - [0, 59] */
int tm_min;      /* minutes after the hour - [0, 59]*/
int tm_hour;     /* hours since midnight - [0, 23]*/
int tm_mday;     /* day of the month - [1, 31]*/
int tm_mon;      /* months since January - [0, 11]*/
int tm_year;     /* years since 1900*/
int tm_wday;     /* days since Sunday [0, 6]*/
int tm_yday;     /* days since January 1 - [0, 365]*/
int tm_isdst;    /* daylight savings time flag*/
}
#define _TM_DEFINED
#endif
/*Clock ticks macro - ANSI version */
#define CLOCKS_PER_SEC 1000
/* Extern declarations for the global variables used by the CTime family
of routines. */
/* non-zero it daylight savings time is used */
_CRTIMP extern int _daylight;
/* offset for Daylight Saving Time */
_CRTIMP extern long _dstbias;
/*difference in seconds between GMT and local time */
_CRTIMP extern long _timezone;
/* standard/daylight savings time zone names */
_CRTIMP extern char * _tzname[2];
```

2.A.2.c. DKDate Constructor With Current System Time-_CRTIMP Definition

The _CRTIMP definition within the struct tm definition of the DKDate constructor based on current system time is implemented by the following:

```
#ifndef      _CRTIMP
#ifdef       _DLL
#define      _CRTIMP _declspec (dllimport)
#else        /* ndef _DLL */
#define      _CRTIMP
#endif       /* _DLL */
#endif       /* _CRTIMP */
```

2.A.2.d. DKDate Constructor With Current System Time-localtime Function

The localtime function of the current system DKDate constructor is implemented by the following:

```
/* Function prototypes */
_CRTIMP char * _cdecl asctime (const struct tm *);
_CRTIMP char * _cdecl ctime (const time_t *);
_CRTIMP clock_t _cdecl clock (void);
_CRTIMP double _cdecl difftime (time_t, time_t);
_CRTIMP struct tm * _cdecl gmtime (const time_t *);
_CRTIMP struct tm * _cdecl localtime (const time_t *);
_CRTIMP time_t _cdecl mktime (struct tm *);
_CRTIMP size_t _cdecl strftime (char * size_t const char *, const struct tm *);
_CRTIMP char * _cdecl strdate (char *);
_CRTIMP char * _cdecl strtime (char *);
_CRTIMP time_t _cdecl time (time_t *);
#ifdef   _POSIX_
_CRTIMP void _cdecl tzset (void);
#else
_CRTIMP void _cdecl _tzset(void);
#endif
/* --------- The following functions are OBSOLETE ---------*/
/* The Win32 API GetLocalTime, and SetLocalTime should be used
instead. */
unsigned _cdecl _getsystime (struct tm *);
unsigned _cdecl _setsystime (struct tm *, unsigned);
/* --------- The preceding functions are OBSOLETE ---------*/
#ifndef _SIZE_T_DEFINED
typedef unsigned int size_t;
#define _SIZE_T_DEFNED
#endif
#ifndef _MAC
#ifndef _WTIME_DEFINED
/* wide function prototypes, also declared in wchar.h */
_CRTIMP wchar_t * _cdecl _wasctime (const struct tm *);
_CRTIMP wchar_t * _cdecl _wctime (const time_t *);
_CRTIMP size_t _cdecl wcsftime (wchar_t *, size_t, const
wchar_t*, const struct tm *);
_CRTIMP wchar_t * _cdecl _wstrdate (wchar_t *);
_CRTIMP wchar_t* _cdecl _wstrtime(wchar_t *);
#define _WTIME_DEFINED
#endif
#endif    /* ndef _MAC */
#if      !_STDC_ ||defined (_POSIX_)
/* Non-ANSI names for compatibility */
#define CLK_TCK   CLOCKS_PER_SEC
_CRTIMP extern int daylight;
_CRTIMP extern long timezone;
_CRTIMP extern char * tzname [2];
_CRTIMP void _cdecl tzset (void);
#endif / * _STDC_ */
#ifdef_cplusplus
#ifdef _MSC_VER
}
#endif
#ifdef _MSC_VER
#pragma pack (pop)
#endif /* _MSC_VER */
#endif /* _INC_TIME */
```

2.A.2.e. DKDate Constructor With Current System Time-_cdecl Definition

The localtime function of DKDate constructors based on current system time utilizes the _cdecl definition if non Microsoft compilers are used. The _cdecl definition is implemented by the following:

```
#if   (!defined (_MSC_VER) && !defined (_cdecl))
#define _cdecl
#endif
```

2.A.3. DKDate Get Methods

In addition, the DKDate class provides three get methods for year, month, and day data which are utilized when generating objects from classes via the constructors. These get methods are defined as the following:

```
int  DKDate::getYear ( )              const
{
    return (_t.GetYear ( ) + _diff);
}
int  DKDate::getMonth ( )             const { return _t.GetMonth ( ); }
int  DKDate::getDay ( )               const { return _t.GetDay ( ); }
```

2.B. DKTimestamp Constructors

Similarly, a DKTimestamp object is generated from the DKTimestamp class via a DKTimestamp constructor (block 120). When the DKTimestamp wrapper class is instantiated, a DKTimestamp object generated from the DKTimestamp wrapper class determines a base year corresponding to a target year. The CTime object__t represents the base year and the offset value __diff as the difference between the base year and the target year when the class is instantiated.

DKTimestamp objects may be generated from two different DKDTimestamp constructors. The first DKTimestamp constructor implements a DKTimestamp object with year, month, day, minute, second, and nanosecond data whereas the second DKTimestamp constructor implements a DKTimestamp object with current system time.

2.B.1. DKTimestamp Constructor With Year Month, Day, Hour, Minute, Second, and Nanosecond The first DKTimestamp constructor provides a DKTimestamp object with year, month, day, hour, minute, second, and nanosecond data. Ths DKTimestamp constructor is implemented by the following:

```
DKTimestamp::DKTimestamp ( int nYear, int nMonth, int nDay,
                int nHour, int nMin, int nSec, int nNano, int DST)
{
    _diff = 0
    if(nYear > 2037)
    {
        _diff = (nYear - 2037);
        _t = CTime (2037, nMonth, nDay, nHour, nMin, nSec, DST);
    }
    else if (nYear < 1970)
    {
        _diff = (nYear - 1970);
        _t = CTime (1970, nMonth, nDay, nHour, aMin, nSec, DST);
    }
    else
    {
        _diff = (0);
        _t = CTime (nYear, nMonth, nDay, nHour, nMin, nSec, DST);
    }
    _nanos = nNano;
}
```

2.B.2. DKTimestamp Constructor With Current System Time

The second type of DKTimestamp constructor generates DKTimestamp objects from the DKTimestamp class utilizing current system time. Current system time may be identified in a parameter that is retrieved from the computer 10, system clock 22, program 33, or some other source. This constructor is implemented by the following:

```
DKTimestamp::DKTimestamp ( )
{
    time_t _time;
    time_t* pTime = &_time;
    struct tm temp;
    struct tm * pTemp = &temp;
    _time = time ((time_t*)NULL);
    pTemp = localtime (pTime);
    int nSec = pTemp->tm_sec;
    int nMin = pTemp->tm_min;
    int nHour = pTemp->tm_hour;
    int nDay = pTemp->tm_mday;
    int nMon = pTemp->tm_mon + 1;
    int nYear = pTemp->tm_year + 1900;
    _diff = 0;
    if (nYear > 2037)
    {
        _diff = (nYear - 2037);
        _t = CTime (2037, nMon, nDay, nHour, nMin, nSec, -1);
    }
    else if (nYear < 1970)
    {
        _diff = (nYear - 1970);
        _t = CTime (1970, nMon, nDay, nHour, nMin, nSec, -1);
    }
    else
    {
        _diff = (0);
        _t = CTime (nYear, nMon, nDay, nHour, nMin, nSec, -1);
    }
    _nanos = 0;
}
```

Similar to the DKDate constructor based on current system time, the DKTimestamp constructor based on current system time does not require a user to input year, month, and day parameters. Rather, as the first line "DKTimestamp::DKTimestamp( )" illustrates, there are no input parameters. The time data is retrieved from the local-time function which queries a local system or server. The time__t and struct tm definitions, localtime function, and related definitions described in paragraphs 2.A.2.A to 2.A.2.E. with respect to the DKDate constructor based on current system time are also utilized in the DKTimestamp constructor utilizing current system time. The DKTimestamp constructor utilizing current system time creates a DKTimestamp object with year, month, day, hour, minute, and second data. The second, minute, hour, and day variables (nSec, nMin, nHour, and nDay) are assigned the values provided for by the local system or server (tm__sec, tm__min, tm__hour, and tm__mday). Similar to the month and year offsets used with the current system time DKDate constructor, nMon is assigned the system month variable (tm__mon) offset by +1 such that the month variable nMon is based on January=1, February=2, and so on. Similarly, the year variable nYear is assigned local system year variable (tm__year) offset by +1900 to account for the computer system 10 designating year 1900 as year 0, 1901 as year 1, etc. Thus, the system output tm__year=45 offset by 1900 results in nYear=1945.

2.B.3. DKTitnesatrnp Get Methods

DKTimestamp also provides seven get methods (getyear, getmonth, getfday, gethours, getMinutes, getSeconds, and getnanos) to retrieve values for the converted year, month, day, hour, minutes, second, and nanosecond for the DKTimestarnp object. These get methods are defmed as the following:

```
int DKTimestamp::getYear ( )      const
{
    return (_t.GetYear ( ) + _diff);
}
int DKTimestamp::getMonth ( )     const { return_t.GetMonth ( );}
int DKTimestamp::getDay ( )       const { return_t.GetDay ( );}
int DKTimestamp::getHours ( )     const { return_t.GetHour ( );}
int DKTimestamp::getMinutes ( )   const { return_t.GetMinute ( );}
int DKTimestamp::getSeconds ( )   const { return_t.GetSecond ( );}
int DKTimestamp::getNanos ( )     const { return_nanos;}
```

3. Invoking Conversion Object

Referring to FIG. 2, the conversion object is invoked (block 130) after the time class has been encapsulated by the wrapper class (block 110) and a conversion object has been generated (block 120). Invoking the conversion object (block 130) initiates the date conversion process. Both DKDate and DKTimnestamp conversion objects identify a target year (block 140), convert the target year to a base year and offset (block 150), store the base year and offset (block 160), execute the application program (block 170), and convert the base year and offset back to the target year (block 180).

4. Identifying Target Year

Figure 3:
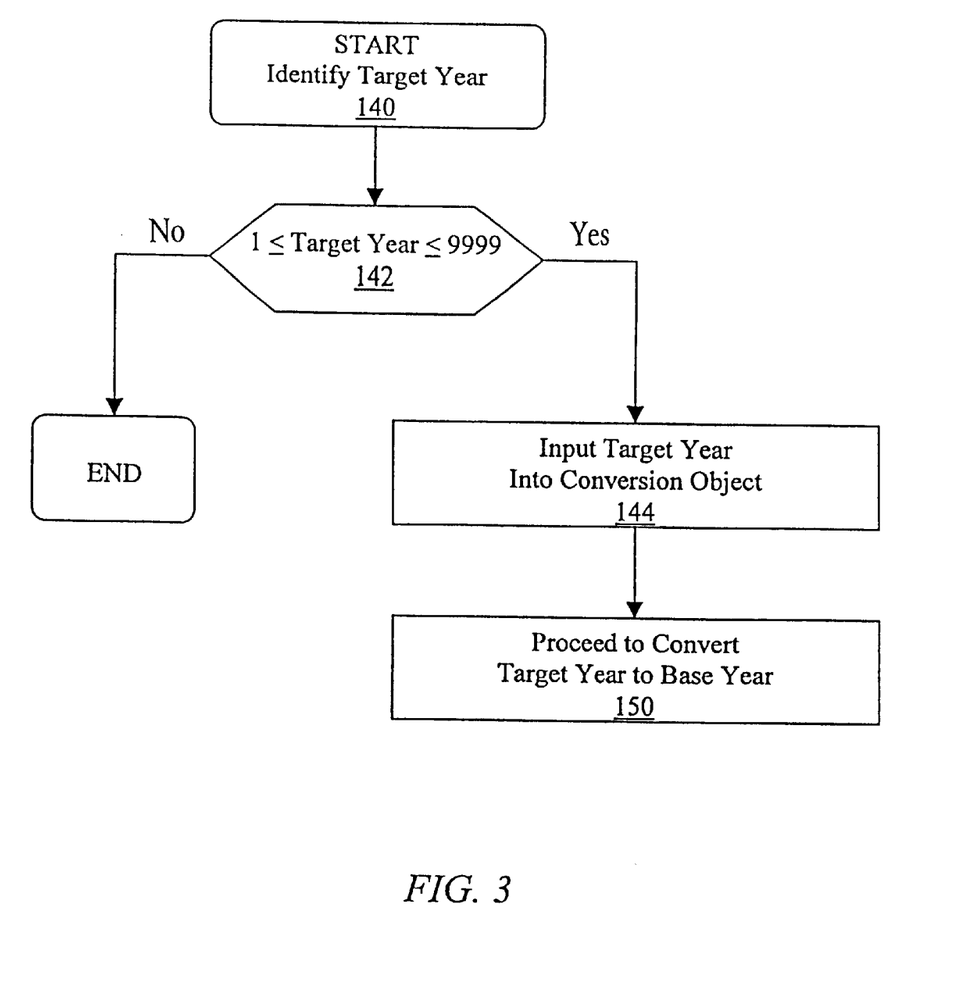
FIG. 3 is a flow diagram illustrating the initial identification of a target year.

Referring to FIGS. 2 and 3, the target year (i.e, the year in which the application program 37 should execute) is then identified (block 140). Referring to FIG. 3, the target year is read by wrapper object generated by the wrapper class 39 to determine whether the target year falls within the range of years 1 to 9999 (block 142). If the target year is outside of the range of years 1 to 9999, the conversion program 39 can not execute and the program 39 terminates. If the target year is within the range of years 1 to 9999, then the target year is inputted into the conversion object (block 144). After the target year is inputted into the conversion object (block 144), the target year is converted to a base year and a resulting offset (block 150).

5. Converting Target Year to Base Year and Resulting Offset

Figure 4:
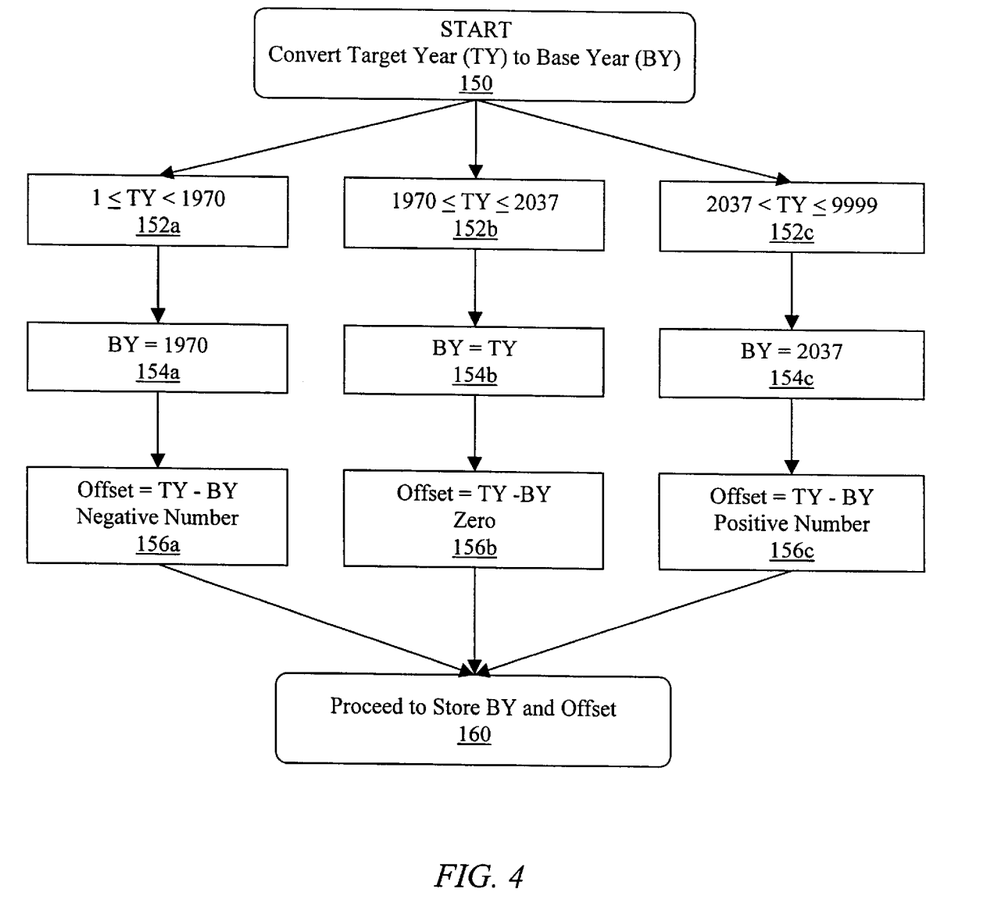
FIG. 4 is a flow diagram illustrating the designation of a base year and resulting offset based on the target year.

Referring to FIGS. 2 and 4, the target year may be converted to a base year and a resulting offset depending on whether the target year falls between the years 1 to 1969, 1970 to 2037 inclusively, or 2038 to 9999 (block 150).

If the target year is less than 1970, i.e., from years 1 to 1969 (block 152a), then the base year is assigned a value of 1970 (block 154a). If the target year is between 1970 and 2037 inclusively (block 152b), then the base year is assigned the same value as the target year (block 154b). If the target year is greater than 2037, i.e., from 2038 to 9999 (152c) then the base year is assigned a value of 2037 (block 154c).

The value of the offset depends on the base year and target year since the offset is calculated as (Target Year-Base Year). If the target year is less than 1970 (152a) such that the base year equals 1970 (block 154a) then the resulting offset is a negative number (block 156a). If the target year is between 1970 and 2037 inclusively (block 152b) such that the base year equals the target year (block 154b), then the resulting offset is zero (block 156b). If the target year is greater than 2037 (block 152c) such that the base year equals 2037 (block 154c) then the resulting offset is a positive number (block 156c).

The following table summarizes the rules used in the wrapper class 39 to determine the values of base year and offset based on the target year:

| Target Year (TY) | Base Year (BY) | Offset | Offset (+/−) |
|---|---|---|---|
| 1 ≦ TY < 1970 | BY = 1970 | Offset = TY − BY | Negative |
| 1970 ≦ TY ≦ 2037 | BY = TY | Offset = TY − BY = TY − TY | Zero |
| 2037 < TY ≦ 9999 | BY = 2037 | Offset = TY − BY | Positive |

For example, year 3000 is represented as base year 2037 plus an offset of 963 since 3000 is greater than 2037. Year 1930 is represented as base year 1970 plus an offset of −40 since 1930 is less than 1970. Year 1999 is represented as base year 1999 plus an offset of zero since 1999 is between 1970 and 2037.

Further, it is apparent to one skilled in the art that other similar base plus offset approaches or similar mathematical operations may be performed to achieve the same results. Namely, a base year can be assigned a particular value and a series of mathematical operations can result in an offset, added to the base value, equals a target year.

6. Storing Base Year and Offset Values

Figure 5:
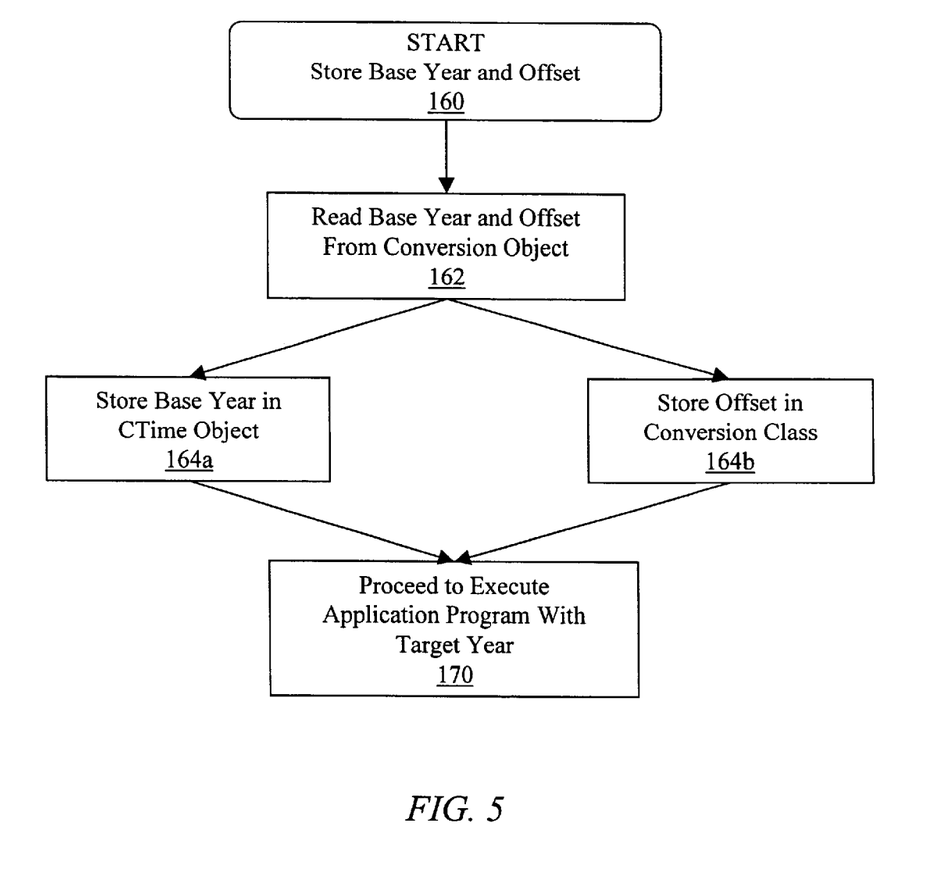
FIG. 5 is a flow diagram illustrating the storage of the base year and resulting offset.

Referring to FIGS. 2 and 5, the base year and offset are stored in memory (block 160) after the target year has been converted to a base year and offset (block 150). More specifically, both the base year and offset values are read from the conversion object (block 162). The base year is then stored as part of a CTime object (block 164a) whereas the offset is cached as an integer or data member in the wrapper class (block 164b).

7. Executing Application Program With Target Year

Referring to FIG. 2, the application program 37 receives the target year and is executed with the target year (block 170). The application program 37 invokes the wrapper class 39 and provides the target year to the wrapper class 39. The wrapper class 39 identifies the target year, determines a base year and resulting offset, and the application program 37 is executed with the target year. Only the wrapper class 39 has access to the base year and offset; the application program 37 and user are unaware that the wrapper class 39 has created a base year and offset. Rather, the wrapper class 39 returns the appropriate year data to the application program 37 to enable the application 37 to execute outside the range of 1970 to 2037 inclusively while the application 37 continues to generate output data to the user.

In another example, the application program 37 does not receive the target year from user input. Rather, the application program 37 executes with a target year provided by a data file 34 managed by the application program 37. For example, the wrapper class 39 may receive the target year from files 34 retrieved from database or World Wide Web (WWW) searches.

The following illustrates one use of the wrapper classes 39. If a user attempts to download a web page 34 retrieved from a WWW search and this web page 34 includes a timestamp outside of the range of 1970 to 2037 inclusively, the user will not be able to view the search results. While the actual search locating the particular web page 34 may be successfully executed, an application program 37 based on CTime 38 used to build or compile the web page 34 will crash because the timestamp is outside of the range of 1970 to 2037 inclusively. However, if the application program 37 calls the wrapper class 39 instead of CTime 38, the search will execute successfully and the user will be able to view the retrieved web page 34. The wrapper class 39 provides the application program 37 with the appropriate time-year data to enable the application 37 to compile database files and web pages 34 with timestamps ranging from years 1 to 9999 rather than within the limited range of years 1970 to 2037.

8. Converting Base Year and Offset Back to Target Year

Figure 6:
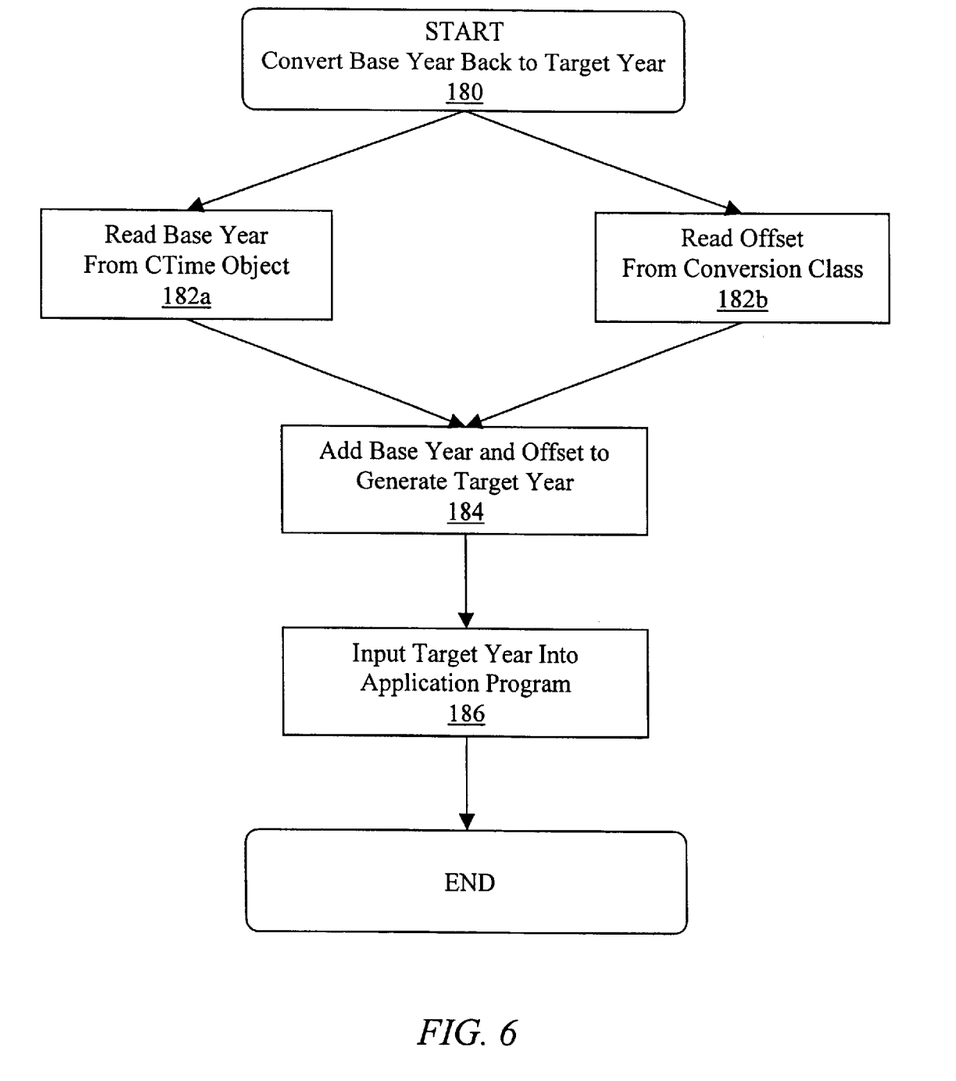
FIG. 6 is a flow diagram illustrating the conversion of the base year and offset back to the target year.

After executing, the application program 37 may need perform a process or generate a data file with the target year. In these situations, the target year can be correctly constructed from the base year and offset (block 180). The base year from the CTime object (block 182a), reading the offset from the DKDate or DKTimestamp conversion class (block 182b), and adding the base year and offset together (block 184). The target year may then be provided to the application for appropriate processing (block 186).

9. Example C++ Program Demonstrating Execution of Conversion Classes

After the forgoing detailed description of how various C++ program elements, classes, objects and variables are created, stored, and utilized to convert dates within object-oriented applications, the following C++ program and resulting output illustrate how these elements work together to solve the year 2038 bug of MFC-based applications utilizing CTime 38:

```cpp
// Test program for DKDate and DKTimestamp
/*
 * Filename      : Test cpp
 * Description   : Test the DKDate and DKTimestamp classes
 *
 */
#include <iostream.h>
#include <stdio.h>
#include <DKConstant.h>
#include <DKDatastoreDL.hpp>
#include <DKAccessControlDL.hpp>
#include <DKException.hpp>
#include <DKString.hpp>
#include <DKEnvironment.hpp>
#include <DKDate.hpp>
void main(int argc, char *argv [ ])
{
    cout << "begin . . . " << end;
    DKEnvironment::setSubSystem(DK_SS_CONSOLE);
    try {
        cout << "testing . . . " << endl;
        DKDate t = DKDate (2038, 1, 18);
        cout    << ">>>>> DKDate (2038, 1, 18)"<<endl;
        cout    << " Year = " << t.getYear ( )
                << " Month = " << t.getMonth ( )
                << " Day = " << t.getDay( )
                << " - - " << t.asString("%Y-%m-%d")
                << endl;
        t = DKDate (2038, 1, 19);
        cout    << ">>>>> DKDate (2038, 1, 19) "<< endl;
        cout    << " Year = " << t.getYear ( )
                << " Month = " << t.getMonth ( )
                << " Day = " << t.getDay ( )
                << " - - " << t.asString ("%Y-%m-%d")
                << endl;
        t = DKDate (1970, 1, 1);
        cout    << ">>>>> DKDate (1970, 1, 1)"<< endl;
        cout    << " Year = " << t.getYear ( )
                << " Month = " << t.getMonth ( )
                << " Day = " << t.getDay ( )
                << " - - " << t.asString ("%Y-%m-%d")
                << endl;
        t = DKDate (1969, 12, 31);
        cout    << ">>>>> DKDate (1969, 12, 31)"<< endl;
        cout    << "Year = " << t.getYear ( )
                << " Month = " << t.getMonth ( )
                << " Day = " << t.getDay ( )
                << " - - " << t.asString ("%Y-%m-%d")
                << endl;
        t = DKDate(3999, 1, 1);
        cout    << ">>>>> DKDate (3999, 1, 1)"<< endl;
        cout    << " Year = " << t.getYear ( )
                << " Month = " << t.getMonth ( )
                << " Day = " << t.getDay ( )
                << " - - " <<t.asString ("%Y-%m-%d")
                << endl;
        t = DKDate( )
        cout    << ">>>>> DKDate( )"<<endl;
        cout    << " Year = " << t.getYear ( )
                << " Month = " << t.getMonth ( )
                << " Day = " << t.getDay( ),
                << " - - " << t.asString ("%Y-%m-%d")
                << endl;
        DKTimestamp ts = DKTimestamp (1900, 1, 1, 10, 30, 59, 200, -1);
        cout    << ">>>>> DKTimestamp (1900, 1, 1, 10, 30, 59, 200, -1)" <<
                endl;
        cout    << " Year = " << ts.getYear ( )
                << " Month = " << ts.getMonth ( )
                << " Day = " << ts.getDay( )
                << " Hours = " << ts.getHours ( )
                << " Minutes = " << ts.getMinutes ( )
                << " Seconds = " << ts.getSeconds ( )
                << " Nanos = " << ts.getNanos ( )
                << endl;
        ts = DKTimestamp (1960, 8, 27, 10, 30, 59, 200, -1);
        cout    << ">>>>> DKTimestamp (1960, 8, 27, 10, 30, 59, 200,-1)" <<
                endl;
```

-continued

```
            cout    << "Year = " << ts.getYear ( )
                    << " Month = " << ts.getMonth ( )
                    << " Day = " << ts.getDay( )
                    << " Hours = " << ts.getHours( )
                    << " Minutes = " << ts.getMinutes ( )
                    << " Seconds = " << ts.getSeconds ( )
                    << " Nanos = " << ts.getNanos ( )
                    << endl;
            ts = DKTimestamp (1999, 8, 27, 10, 30, 59, 200, -1);
            cout    << ">>>>> DKTimestamp (1999, 8, 27, 10, 30, 59, 200, 1)"<<
                    endl;
            cout    << " Year = " << ts.getYear ( )
                    << " Month = " << ts.getMonth ( )
                    << " Day = " << ts.getDay ( )
                    << " Hours = " << ts.getHours ( )
                    << " Minutes = " << ts.getMinutes ( )
                    << " Seconds = " << ts.getSeconds ( )
                    << " Nanos = " << ts.getNanos ( )
                    << endl;
            ts DKTimestamp (2999, 8, 27, 10, 30, 59, 200, -1);
            cout    << ">>>>> DKTimestamp (2999, 8, 27, 10, 30, 59, 200, -1)" <<
                    endl;
            cout    << "Year = "<< ts.getYear ( )
                    << " Month = "<< ts.getMonth ( )
                    << " Day = " << ts.getDay ( )
                    << " Hours = " << ts.getHours ( )
                    << " Minutes = " << ts.getMinutes ( )
                    << " Seconds = " << ts.getSeconds ( )
                    << " Nanos = "<< ts.getNanos ( )
                    << endl;
            ts = DKTimestamp( );
            cout    << ">>>>> DKTimestamp( )" << endl;
            cout    << "Year = " << ts.getYear ( )
                    << " Month = " << ts.getMonth ( )
                    << " Day = " << ts.getDay ( )
                    << " Hours = " << ts.getHours ( )
                    << " Minutes = " << ts.getMinutes ( )
                    << " Seconds = " << ts.getSeconds ( )
                    << " Nanos = "<< ts.getNanos ( )
                    << endl;
        cout << "end of testing" << endl;
    }
    catch (DKException &exc)
    {
        cout << "Error id" << exc.errorId( ) << endl;
        for (unsigned long i = 0; i< exc.textCount( );i++)
        {
            cout << "Error text: " << exc.text(i) << endl;
        }
        for (unsigned long g=0; g<exc.locationCount( );g++)
        {
            const DKExceptionLocation* p = exc.locationAtIndex(g);
            cout << "Filename: " << p->fileName( ) << endl;
            cout << "Function: " << p->functionName( ) << endl;
            cout << "LineNumber: " << p->lineNumber( ) << endl;
        }
        cout << "Exception Class Name: " << exc.name( ) << endl;
    }
    cout << "done . . . " << endl;
}
```

10. Output of Sample C++ Program

The output of the sample C++ program demonstrates that the DKDate and DKTimestamp classes convert dates outside the range of Jan. 1, 1970 and Jan. 18, 2038 while utilizing classes with predefined time variables, current system time data, or user supplied data The output generated by the program is the following:

```
begin . . .
testing . . .
>>>>> DKDate (2038, 1, 18)
Year = 2038 Month = 1 Day = 18 - - 2038-01-18
>>>>> DKDate (2038, 1, 19)
Year = 2038 Month = 1 Day = 19 - - 2038-01-19
>>>>> DKDate (1970, 1, 1)
```

-continued

```
Year = 1970 Month = 1 Day = 1 - - 1970-01-01
>>>>> DKDate (1969, 12, 31)
Year = 1969 Month = 12 Day 31 - - 1969-12-31
>>>>> DKDate (3999, 1, 1)
Year 3999 Month = 1 Day = 1 - - 3999-01-01
>>>>> DKDate ( )
Year = 1999 Month = 9 Day = 1 - - 1999-09-01
>>>>> DKTimestamp (1900, 1, 1, 10, 30, 59, 200, –1)
Year = 1900 Month = 1 Day = 1 Hours = 10 Minutes = 30 Seconds 59 Nanos = 200
>>>>> DKTimestamp (1960, 8, 27, 10, 30, 59, 200, –1)
Year = 1960 Month = 8 Day = 27 Hours!= 10 Minutes = 30 Seconds 59 Nanos = 200
>>>>> DKTimestamp (1999, 8, 27, 10, 30, 59, 200, –1)
Year = 1999 Month = 8 Day = 27 Hours = 10 Minutes = 30 Seconds 59 Nanos = 200
>>>>> DKTimestamp (2999, 8, 27, 10, 30, 59, 200, –1)
Year = 2999 Month = 8 Day = 27 Hours 10 Minutes = 30 Seconds 59 Nanos = 200
>>>>> DKTimestamp ( )
Year = 1999 Month = 9 Day = 1 Hours = 11 Minutes = 46 Seconds 11 Nanos = 0
end of testing
done . . .
```

As the program output illustrates, the dates that would have caused the application program 37 to fail, namely, those before Jan. 1, 1970 and those after Jan. 18, 2038 are properly converted with the conversion classes 39 to enable the application 37 to execute.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention. Additionally it will be understood that the object-oriented framework for providing access control can be used to provide access control to various types of multimedia datastores, and is not limited to a digital library. It will also be understood that the functions and methods described in the sample classes above can be varied and modified as necessary without departing from the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of converting date data in a computer system, the method comprising the steps of:
   providing a conversion class that encapsulates a time class, wherein the time class covers a limited time period;
   generating a conversion object from the conversion class;
   when the conversion object is invoked,
      identifying a target date;
      determining whether the target date falls outside of the limited time period; and
      when the target date falls outside of the limited time period, converting the target date to one that falls within the limited time period,
   wherein the target date comprises a target year and converting the target date comprises:
      determining a base year; and
      calculating a resulting offset as a difference between the target year and the base year; and
   wherein the base year is assigned a value of 1970 if the target year is less than 1970.

2. A method of converting date data in a computer system, the method comprising the steps of:
   providing a conversion class that encapsulates a time class, wherein the time class covers a limited time period;
   generating a conversion object from the conversion class;
   when the conversion object is invoked,
      identifying a target date;
      determining whether the target date falls outside of the limited time period; and
      when the target date falls outside of the limited time period, converting the target date to one that falls within the limited time period,
   wherein the target date comprises a target year and converting the target date comprises:
      determining a base year; and
      calculating a resulting offset as a difference between the target year and the base year; and
   wherein the base year is assigned a value of 2037 if the target year is greater than 2037.

3. An apparatus for converting date data in a computer system, comprising:
   a computer having a clock and a data storage device storing data files connected thereto; and
   one or more programs, performed by the computer, for providing a conversion class that encapsulates a time class wherein the time class covers a limited time period; for generating a conversion object from the conversion class; and for, when the conversion object is invoked, identifying the target date, determining whether the target date is outside of the limited time period, and, when the target date falls outside of the limited time period, converting the target date to one that falls within the limited time period,
   wherein the target date comprises a target year and converting the target date comprises:
      determining a base year; and
      calculating a resulting offset as a difference between the base year and the target year, and
   wherein the base year is assigned a value of 1970 if the target year is less than 1970.

4. An apparatus for converting date data in a computer system, comprising:
- a computer having a clock and a data storage device storing data files connected thereto; and
- one or more programs, performed by the computer, for providing a conversion class that encapsulates a time class wherein the time class covers a limited time period; for generating a conversion object from the conversion class; and for, when the conversion object is invoked, identifying the target date, determining whether the target date is outside of the limited time period, and, when the target date falls outside of the limited time period, converting the target date to one that falls within the limited time period,
- wherein the target date comprises a target year and converting the target date comprises:
  - determining a base year; and
  - calculating a resulting offset as a difference between the base year and the target year, and
- wherein the base year is assigned a value of 2037 if the target year is greater than 2037.

5. An article of manufacture comprising a computer program carrier readable by a computer having a clock, a data file, and an application program and embodying one or more instructions executable by the computer to perform method steps for converting date data in the computer, the method comprising the steps of:
- providing a conversion class that encapsulates a time class, wherein the time class covers a limited time period;
- generating a conversion object from the conversion class;
- when the conversion object is invoked,
  - identifying a target date;
  - determining whether the target date falls outside of the limited time period; and
  - when the target date falls outside of the limited time period, converting the target date to one that falls within the limited time period,
- wherein the target date comprises a target year and converting the target year comprises:
  - determining a base year; and
  - calculating a resulting offset as a difference between the target year and the base year; and
- wherein the base year is assigned a value of 1970 if the target year is less than 1970.

6. An article of manufacture comprising a computer program carrier readable by a computer having a clock, a data file, and an application program and embodying one or more instructions executable by the computer to perform method steps for converting date data in the computer, the method comprising the steps of:
- providing a conversion class that encapsulates a time class, wherein the time class covers a limited time period;
- generating a conversion object from the conversion class;
- when the conversion object is invoked,
  - identifying a target date;
  - determining whether the target date falls outside of the limited time period; and
  - when the target date falls outside of the limited time period, converting the target date to one that falls within the limited time period,
- wherein the target date comprises a target year and converting the target year comprises:
  - determining a base year; and
  - calculating a resulting offset as a difference between the target year and the base year; and
- wherein the base year is assigned a value of 2037 if the target year is greater than 2037.

* * * * *